United States Patent
Livescu et al.

(10) Patent No.: US 10,560,015 B1
(45) Date of Patent: Feb. 11, 2020

(54) SYSTEMS AND METHODS FOR OPTIMIZATIONS AND FIELD CONFIGURATIONS OF POWER CONVERTERS FOR A POWER SUPPLY UNIT

(71) Applicant: Dell Products L.P., Round Rock, TX (US)

(72) Inventors: Constantin Darius Livescu, Austin, TX (US); Padmanabh R. Gharpure, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/366,814

(22) Filed: Mar. 27, 2019

(51) Int. Cl.
   *H02M 3/156* (2006.01)
   *H02M 1/42* (2007.01)
   *H02M 7/217* (2006.01)

(52) U.S. Cl.
   CPC ........ *H02M 1/4258* (2013.01); *H02M 3/156* (2013.01); *H02M 7/217* (2013.01)

(58) Field of Classification Search
   CPC ..... H02M 1/4258; H02M 3/156; H02M 7/217
   See application file for complete search history.

(56) References Cited

U.S. PATENT DOCUMENTS 9,997,996 B1* 6/2018 Halberstadt ......... H02M 1/4225
2018/0175740 A1* 6/2018 Humphrey .............. H02M 1/36

* cited by examiner

*Primary Examiner* — Adolf D Berhane
*Assistant Examiner* — Afework S Demisse
(74) *Attorney, Agent, or Firm* — Jackson Walker L.L.P.

(57) ABSTRACT

A power supply unit may include a first power converter configured to generate an output voltage to an output of the power supply unit, wherein the first power converter has a first power capacity, a second power converter configured to generate the output voltage to the output of the power supply unit, wherein the second power converter has a second power capacity substantially greater than the first power capacity, and a controller configured to selectively enable and disable each of the first power converter and the second power converter based on one or more parameters associated with the power supply unit.

20 Claims, 4 Drawing Sheets

SYSTEMS AND METHODS FOR OPTIMIZATIONS AND FIELD CONFIGURATIONS OF POWER CONVERTERS FOR A POWER SUPPLY UNIT

TECHNICAL FIELD

The present disclosure relates in general to information handling systems, and more particularly to systems and methods for optimizing power converters for a power supply unit.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include one or more power supply units for providing electrical energy to components of the information handling system. Typically, a power supply unit is configured to convert an alternating-current waveform received at an input to a bulk direct-current waveform, which is in turn converted at the output of the power supply unit to an output direct-current waveform used to power components of the information handling system. Thus, a power supply unit may include a rectifier and/or power factor correction stage configured to receive the input alternating current source and rectify the input alternating waveform to charge a bulk capacitor to a desired voltage. A direct-current-to-direct-current stage may convert the voltage on the bulk capacitor to a direct-current output voltage provided to components of the information handling system in order to power such components.

Using traditional approaches, existing power supply units often have low efficiencies at light loads. Typically, a main power stage of a power supply unit is optimized for higher loads in order to meet thermal requirements of a system. Thus, for lower loads of the power supply unit, power supply efficiency may be much lower.

In addition, information handling systems are seeing increasing demand for standby power. Existing PSUs used in information handling systems often include a standby power converter as a low power cost optimized design which may be less efficient and limited in power capacity. Future generation information handling systems are expected to have a higher demand for standby power (e.g., three times the requirement of existing systems).

Furthermore, traditional power supply units often lack scalability. For example, if a need arises to increase power capacity in an information handling system, a user of the information handling system may need to swap out a lower-capacity power supply unit in favor of a higher-capacity power supply unit. The range of capacities required for information handling system servers (e.g., 500 W to 2400 W) requires multiple parts to be designed and stocked, leading to complexity.

SUMMARY

In accordance with the teachings of the present disclosure, the disadvantages and problems associated with existing power supply units may be reduced or eliminated.

In accordance with embodiments of the present disclosure, a power supply unit may include a first power converter configured to generate an output voltage to an output of the power supply unit, wherein the first power converter has a first power capacity, a second power converter configured to generate the output voltage to the output of the power supply unit, wherein the second power converter has a second power capacity substantially greater than the first power capacity, and a controller configured to selectively enable and disable each of the first power converter and the second power converter based on one or more parameters associated with the power supply unit.

In accordance with these and other embodiments of the present disclosure, a method may be provided for use in a power supply unit comprising a first power converter configured to generate an output voltage to an output of the power supply unit, wherein the first power converter has a first power capacity and a second power converter configured to generate the output voltage to the output of the power supply unit, wherein the second power converter has a second power capacity substantially greater than the first power capacity. The method may include selectively enabling and disabling each of the first power converter and the second power converter based on one or more parameters associated with the power supply unit.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 1:
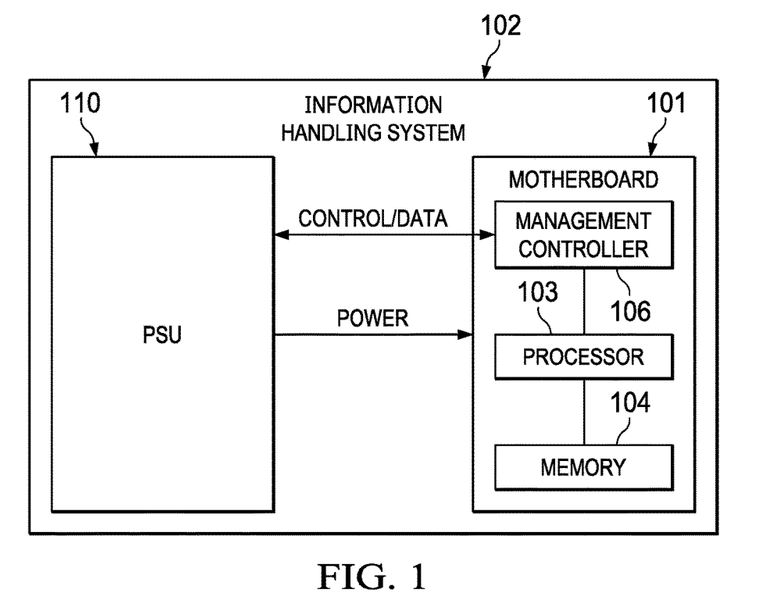
FIG. 1 illustrates a block diagram of selected components of an example information handling system, in accordance with embodiments of the present disclosure.

FIG. 1 illustrates a block diagram of selected components of an example information handling system 102, in accordance with embodiments of the present disclosure. As depicted, information handling system 102 may include a power supply unit (PSU) 110, a motherboard 101, and one or more other information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, memory 104, a management controller 106, and one or more other information handling resources.

Processor 103 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Management controller 106 may be configured to provide out-of-band management facilities for management of information handling system 102. Such management may be made by management controller 106 even if information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, management controller 106 may be configured to communicate with a PSU 110 to communicate control and/or telemetry data between management controller 106 and PSU 110 (e.g., via a Power Management Bus). For example, PSU 110 may communicate information regarding status and/or health of PSU 110 and/or measurements of electrical parameters (e.g., electrical currents or voltages) present within PSU 110.

Generally speaking, PSU 110 may include any system, device, or apparatus configured to supply electrical current to one or more information handling resources of information handling system 102. Example implementations of PSU 110 may be represented below by FIGS. 2 and 4 and the descriptions thereof.

In addition to motherboard 101, processor 103, memory 104, management controller 106, and PSU 110, information handling system 102 may include one or more other information handling resources. For example, in some embodiments, information handling system 102 may include more than one PSU 110.

Figure 2:
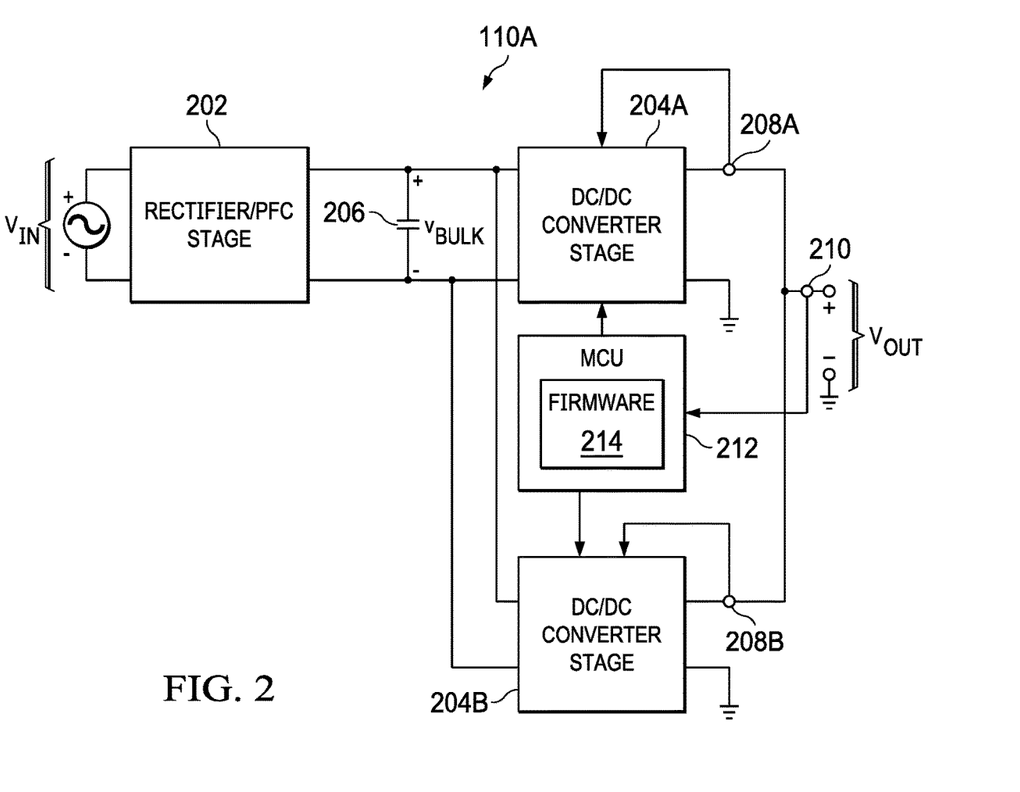
FIG. 2 illustrates a block diagram of selected components of an example power supply unit, in accordance with embodiments of the present disclosure.

FIG. 2 illustrates a block diagram of selected components of an example PSU 110A, in accordance with embodiments of the present disclosure. Example PSU 110A of FIG. 2 may be used in some embodiments to implement PSU 110 depicted in FIG. 1. As shown in FIG. 2, PSU 110A may include a microcontroller unit (MCU) 212 and a power train with multiple converter stages: a rectifier/power factor correcting (PFC) stage 202, a plurality of DC/DC converter stages 204 (e.g., DC/DC converter stage 204A and DC/DC converter stage 204B), and a bulk capacitor 206 coupled between an output of rectifier/PFC stage 202 and the respective inputs of DC/DC converter stages 204.

MCU 212 may comprise a microprocessor, DSP, ASIC, FPGA, EEPROM, or any combination thereof, or any other device, system, or apparatus for controlling operation of PSU 110A. As such, MCU 212 may comprise firmware, logic, and/or data for controlling functionality of PSU 110A. In some embodiments, an MCU 212 may be communicatively coupled to management controller 106 allowing for communication of data and/or control signals between management controller 106 and MCU 212.

As shown in FIG. 2, MCU 212 may have stored thereon firmware 214 (or, in some embodiments, firmware 214 may be stored on computer-readable media accessible by MCU 212). Firmware 214 may comprise any program of executable instructions, or aggregation of programs of executable instructions, configured to perform the functionality of MCU 212, including managing and/or controlling the operation of PSU 110A. In some embodiments, firmware 116 may be implemented with an operating system, such as Linux, for example.

The power train of PSU 110A may be coupled at its outputs to a power bus configured to deliver electrical energy to motherboard 101 and other components of information handling system 102. Such power train may be configured to convert electrical energy received by PSU 110A (e.g., a 120-volt alternating current voltage waveform) into electrical energy usable to information handling resources of information handling system 102 (e.g., 12-volt direct current voltage source). In some embodiments, the power train may comprise a rectifier. In these and other embodiments, the power train may comprise a voltage regulator (e.g., a multi-phase voltage regulator). As mentioned above, the power train of PSU 110A may comprise rectifier/power factor correcting (PFC) stage 202, a plurality of DC/DC converter stages 204, and a bulk capacitor 206.

Rectifier/PFC stage 202 may be configured to, based on an input current $I_{in}$, a sinusoidal voltage source $v_{IN}$, and a bulk capacitor voltage $V_{BULK}$, shape the input current $I_{in}$ to have a sinusoidal waveform in-phase with the source voltage via and to generate regulated DC bus voltage $V_{BULK}$ on bulk capacitor 206. In some embodiments, rectifier/PFC stage 202 may be implemented as an AC/DC converter using a boost converter topology.

Each DC/DC converter stage 204 may be configured to convert bulk capacitor voltage $V_{BULK}$ to a DC output voltage $V_{OUT}$ which may be provided to a load (e.g., to motherboard 101 and/or other information handling resources of information handling system 102 in order to power such information handling resources). In some embodiments, DC/DC converter stage 204 may be implemented as a resonant converter which converts a higher DC voltage (e.g., 400 V) into a lower DC voltage (e.g., 12 V).

As shown in FIG. 2, PSU unit 110A may also include current sensors 208A and 208B, configured to sense output currents delivered by DC/DC converter stage 204A and DC/DC converter stage 204B, respectively. Signals indicative of the current delivered by each DC/DC converter stage 204 may be fed back to their respective DC/DC converter stage 204 in order for the respective DC/DC converter stage 204 to properly regulate its operation and output voltage.

As shown in FIG. 2, PSU unit 110A may also include current sensor 210, configured to sense cumulative output currents delivered by DC/DC converter stages 204. Signals indicative of the cumulative current delivered by DC/DC converter stages 204 may be fed back MCU 212 such that MCU 212 may control operation of PSU 110A in accordance with such measured current (which may be indicative of a power delivered by PSU 110A).

Figure 3A:
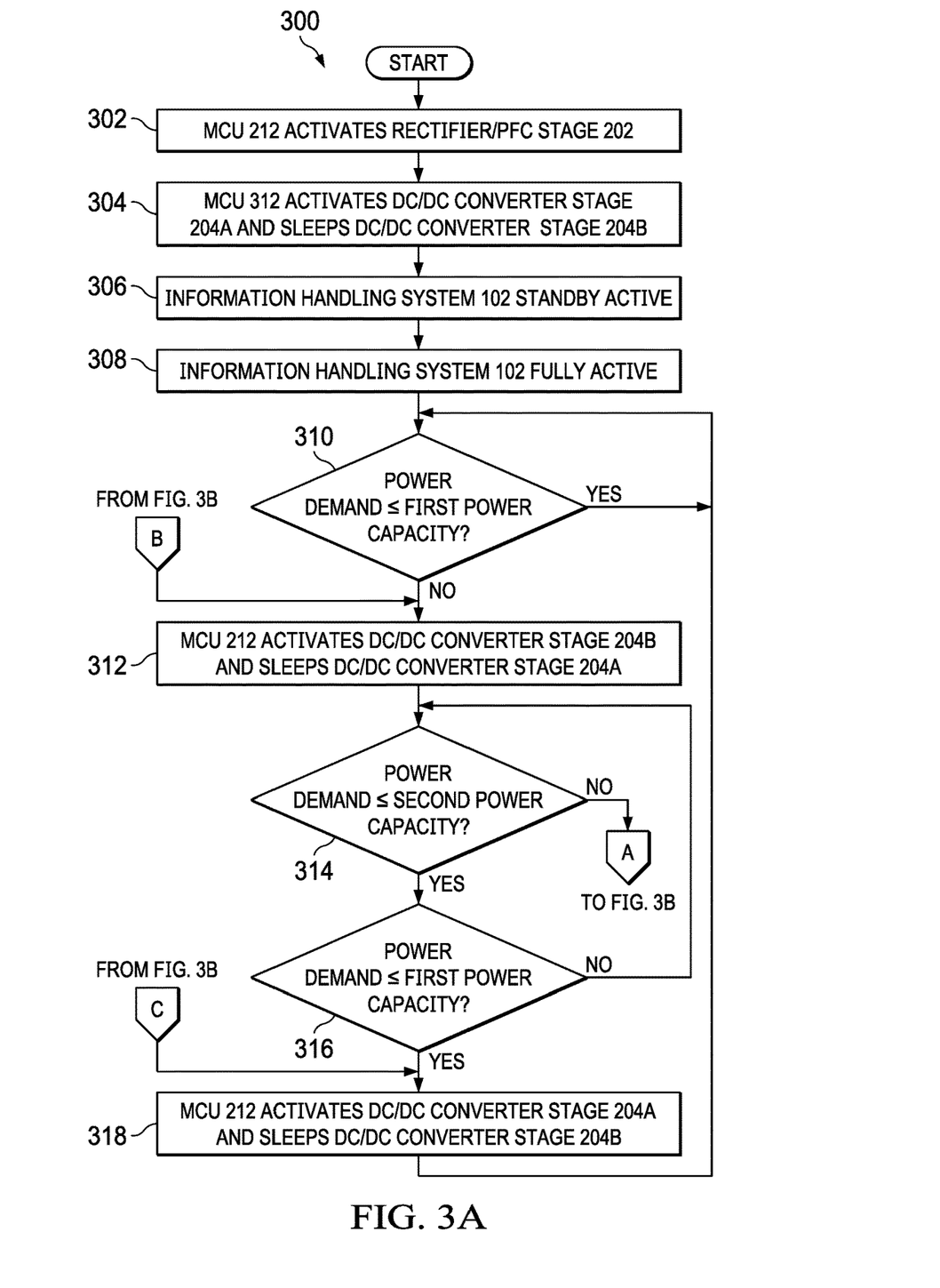
FIG. 3A and FIG. 3B (which may be referred to collectively herein as "FIG. 3") illustrate a flow chart of an example method for operation of the example power supply unit depicted in FIG. 2, in accordance with embodiments of the present disclosure.
Figure 3B:
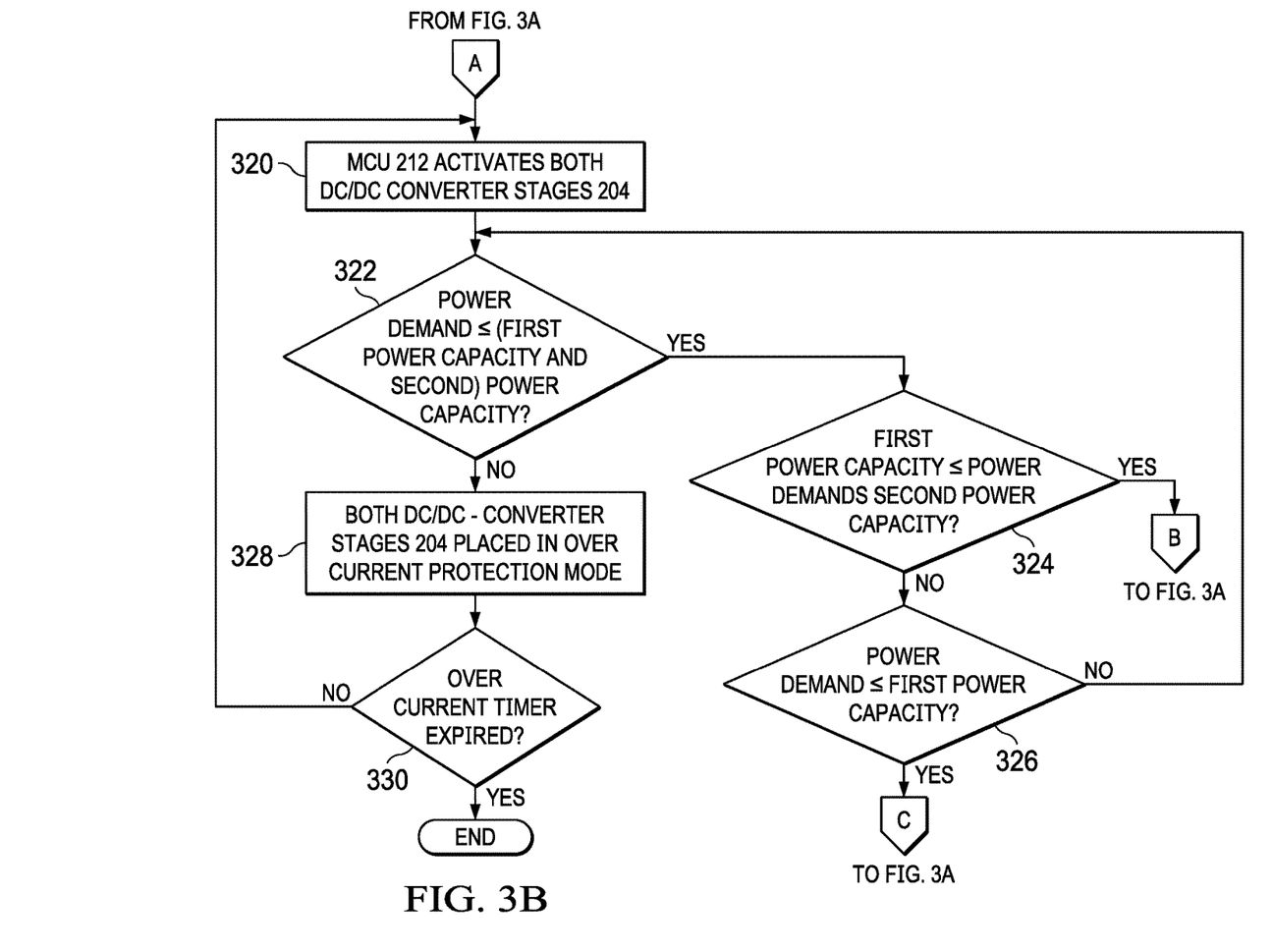

In some embodiments, DC/DC converter stage 204A may have a first power capacity and DC/DC converter stage 204B may have a significantly different second power capacity (e.g., the second power capacity may be twice that of the first power capacity). In operation, at powering on of information handling system 102, MCU 212 may activate (e.g., turn on) DC/DC converter stage 204A in order to deliver standby power to components of information handling system 102. During this time, MCU 212 may cause DC/DC converter stage 204B to run in a low power (e.g., sleep) mode in order to minimize idling power loss. Once information handling system 102 has booted, if the power demand of information handling system 102 exceeds the first power capacity (e.g., as indicated by current sensor 210), MCU 212 may activate DC/DC converter stage 204B and then deactivate DC/DC converter stage 204A and cause DC/DC converter stage 204B to enter a low power (e.g., sleep mode). Further, if the power demand of information handling system 102 exceeds the second power capacity, MCU 212 may activate DC/DC converter stage 204A and leave DC/DC converter stage 204B activated. MCU 212 may also deactivate converter stage 204A if the power demand of information handling system 102 is less than the second power capacity. Additionally, in case of overload, both DC/DC converter stages 204 may respond by applying overcurrent protection based on a total current demand and duration thereof. Operation of PSU 110A is described in greater detail with respect to FIG. 3 below.

FIG. 3 illustrates a flow chart of an example method 300 for operation of example PSU 110A depicted in FIG. 2, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

Method 300 may begin at step 302, following an initial powering on of information handling system 102. At step 302, MCU 212 may activate rectifier/PFC stage 202. Subsequently, at step 304, MCU 212 may activate DC/DC converter stage 204A and cause DC/DC converter stage 204B to remain in a low-power/sleep mode, such that power demands of information handling system 102 are supplied by DC/DC converter stage 204A. At step 306, a standby mode of information handling system 102 may become active. Later, at step 308, information handling system 102 may become fully active.

At step 310, MCU 212 may determine whether the power demand of information handling system 102 is less than the first power capacity of DC/DC converter stage 204A. As long as the power demand of information handling system 102 is less than the first power capacity of DC/DC converter stage 204A, method 300 may remain at step 310. Otherwise, once the power demand of information handling system 102 exceeds the first power capacity of DC/DC converter stage 204A, method 300 may proceed to step 312.

At step 312, MCU 212 may activate DC/DC converter stage 204B and cause DC/DC converter stage 204A to enter into a low-power/sleep mode, such that power demands of information handling system 102 are supplied by DC/DC converter stage 204B. At step 314, MCU 212 may determine whether the power demand of information handling system 102 is less than the second power capacity of DC/DC converter stage 204B. If the power demand of information handling system 102 is less than the second power capacity of DC/DC converter stage 204B, method 300 may proceed to step 316. Otherwise, if the power demand of information handling system 102 exceeds the second power capacity of DC/DC converter stage 204B, method 300 may proceed to step 320.

At step 316, MCU 212 may determine whether the power demand of information handling system 102 is less than the first power capacity of DC/DC converter stage 204A. If the power demand of information handling system 102 exceeds the first power capacity of DC/DC converter stage 204A, method 300 may proceed again to step 314. Otherwise, if the power demand of information handling system 102 is less than the first power capacity of DC/DC converter stage 204A, method 300 may proceed to step 318.

At step 318, MCU 212 may activate DC/DC converter stage 204A and cause DC/DC converter stage 204B to remain in a low-power/sleep mode, such that power demands of information handling system 102 are supplied by DC/DC converter stage 204A. After completion of step 318, method 300 may proceed again to step 310.

At step 320, MCU 212 may activate both DC/DC converter stages 204, such that power demands of information handling system 102 are supplied by both DC/DC converter stages 204 operating in tandem. At step 322, MCU 212 may determine whether the power demand of information handling system 102 is less than the sum of the first power capacity of DC/DC converter stage 204A and the second power capacity of DC/DC converter stage 204B. If the power demand of information handling system 102 is less than the sum of the first power capacity of DC/DC converter stage 204A and the second power capacity of DC/DC converter stage 204B, method 300 may proceed to step 324. Otherwise, if the power demand of information handling system 102 exceeds the sum of the first power capacity of DC/DC converter stage 204A and the second power capacity of DC/DC converter stage 204B, method 300 may proceed to step 328.

At step 324, MCU 212 may determine whether the power demand of information handling system 102 is between the first power capacity of DC/DC converter stage 204A and the second power capacity of DC/DC converter stage 204B. If the power demand of information handling system 102 is between the first power capacity of DC/DC converter stage 204A and the second power capacity of DC/DC converter stage 204B, method 300 may proceed again to step 312. Otherwise, if the power demand of information handling system 102 is not between the first power capacity of DC/DC converter stage 204A and the second power capacity of DC/DC converter stage 204B, method 300 may proceed to step 326.

At step 326, MCU 212 may determine whether the power demand of information handling system 102 is less than the first power capacity of DC/DC converter stage 204A. If the power demand of information handling system 102 exceeds the first power capacity of DC/DC converter stage 204A, method 300 may proceed again to step 322. Otherwise, if the power demand of information handling system 102 is less than the first power capacity of DC/DC converter stage 204A, method 300 may proceed again to step 318.

At step 328, because the power demand of information handling system 102 exceeds the combined power capacities of both DC/DC converter stages 204, an overcurrent condition exists, and both DC/DC converter stages 204 may be placed in an overcurrent protection mode and an overcurrent protection current timer may be started. At step 330, if the overcurrent protection timer expires while DC/DC converter stages 204 are in their overcurrent protection modes, method 300 may end. Otherwise, if the overcurrent protection timer does expire before DC/DC converter stages 204 exit their overcurrent protection modes, method 300 may proceed again to step 320 in which both DC/DC converter stages 204 will operate in their regular active operational modes.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

Figure 4:
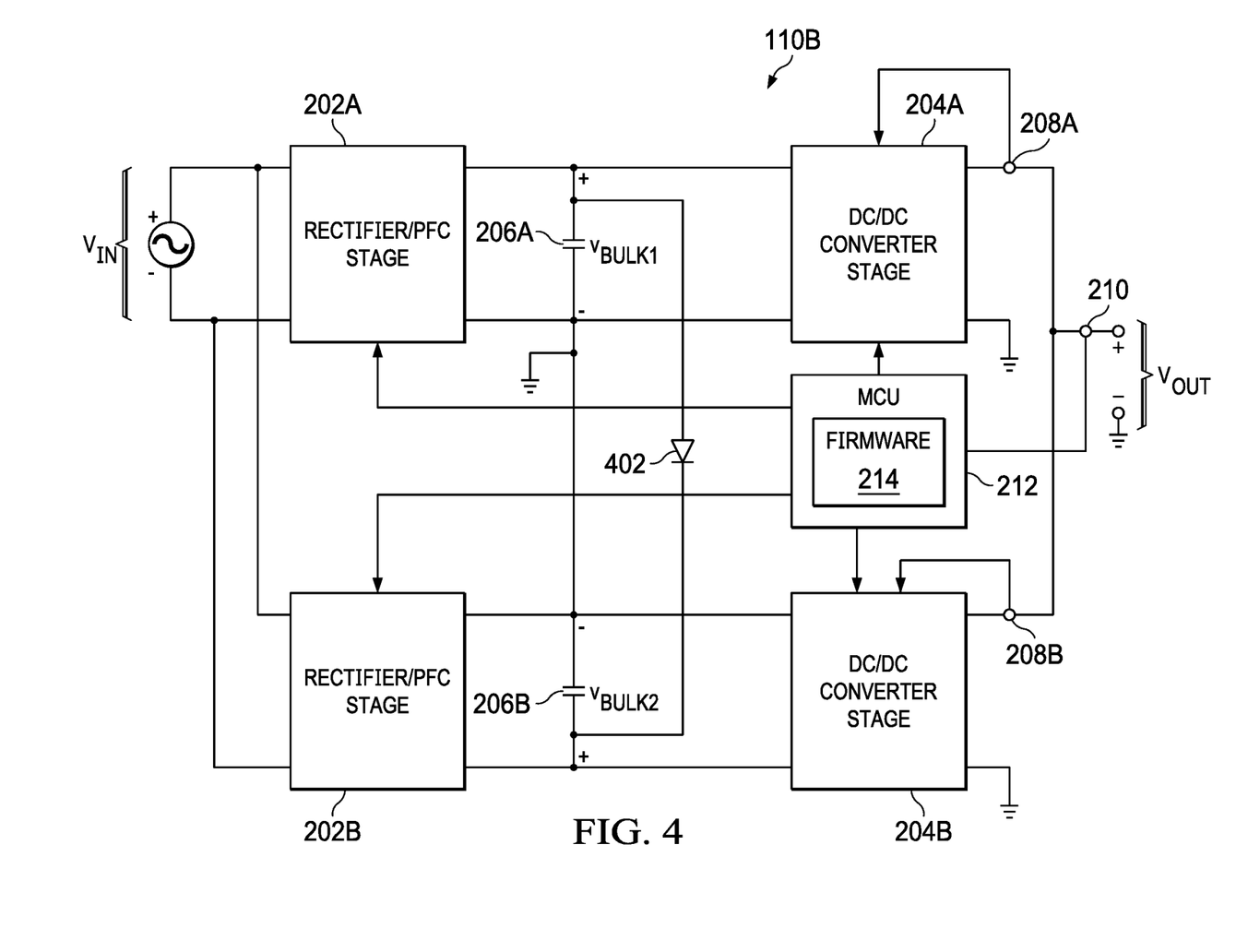
FIG. 4 illustrates a block diagram of selected components of another example power supply unit, in accordance with embodiments of the present disclosure.

FIG. 4 illustrates a block diagram of selected components of an example PSU 110B, in accordance with embodiments of the present disclosure. Example PSU 110B of FIG. 4 may be used in some embodiments to implement PSU 110 depicted in FIG. 1. PSU 110B of FIG. 4 may be similar in many respects to PSU 110A of FIG. 2, and thus, only the main differences between PSU 110A and PSU 110B may be described below. In particular, the main difference between PSU 110A and PSU 110B is that rectifier/PSU stage 202 is split into two rectifier/PSU stages 202A and 202B, each rectifier/PSU stage 202A and 202B associated with a respective DC/DC converter stage 204A and 204B. In addition, instead of a single bulk capacitor 206 as in PSU 110A of FIG. 2, PSU 110B may include a bulk capacitor 206A coupled between rectifier/PSU stage 202A and DC/DC converter stage 204A, a bulk capacitor 206B coupled between rectifier/PSU stage 202B and DC/DC converter stage 204B, and a diode 402 coupled at its anode to a positive output terminal of rectifier/PSU stage 202A and coupled at its cathode to a positive output terminal of rectifier/PSU stage 202B. PSU 110B may operate in a similar manner to that described with respect to method 300 above, except that when a particular DC/DC converter stage 204 is in a low-power/sleep state, its respective rectifier/PSU stage 202 may also be maintained in a low-power/sleep state. Another difference is the presence of diode 402 in PSU 110B, which may keep bulk capacitor 206B charged when rectifier/PSU stage 202B is in the low-power/sleep state. By pre-charging bulk capacitor 206B in this manner, DC/DC converter stage 204B may wake up/activate quickly to support increase load until such time as rectifier/PSU stage 202B is woken up/activated. Another advantage of pre-charging bulk capacitor 206B is that it may reduce an inrush current when rectifier/PSU stage 202B wakes/activates.

In addition to or in lieu of the functionality described above, in some embodiments, firmware 214 may include logic to selectively program DC/DC converter stages 204 to provide a defined power capacity for a PSU 110. Accordingly, firmware 214 may be field programmable to allow a plurality of power capacities—(i) the first power capacity of DC/DC converter stage 204A, (ii) the second power capacity of DC/DC converter stage 204B, and (iii) a third power capacity equal to the sum of the first power capacity and the second power capacity—to be provided from a single PSU 110. For example, a user may acquire an information handling system 102 with PSU 110 programmed for the first power capacity, and firmware 214 may only allow DC/DC converter stage 204A but not DC/DC converter stage 204B to be enabled for use. If at a later time, the user finds more power is required, the user can opt in for a power capacity upgrade to PSU 110 which may be enabled simply by the vendor of information handling system 102 and/or PSU 110 authorizing a suitable upgrade to firmware 214 such that firmware 214 either: (a) allows DC/DC converter stage 204B but not DC/DC converter stage 204A to be enabled for use such that PSU 110 has the second power capacity; or (b) allows both DC/DC converter stages 204 to be enabled for use such that PSU 110 has the third power capacity. Thus, MCU 212 may selectively enable and disable DC/DC converter stages 204 based on an authorized power capacity available to PSU 110.

Such approach may reduce the number of different types of PSUs required, particularly in higher power ranges, as a single PSU 110 may be field-programmable through an appropriate firmware update to modify power capacity.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A power supply unit comprising:
a first power converter configured to generate an output voltage to an output of the power supply unit, wherein the first power converter has a first power capacity;
a second power converter configured to generate the output voltage to the output of the power supply unit, wherein the second power converter has a second power capacity substantially greater than the first power capacity; and
a controller configured to selectively enable and disable each of the first power converter and the second power converter based on a power parameter associated with the power supply unit, wherein such selective enabling and disabling of the first power converter and the second power converter comprises:
enabling the first power converter and disabling the second power converter when the power parameter is below the first power capacity;
enabling the second power converter and then disabling the first power converter when the power parameter is above the first power capacity and below the second power capacity; and
enabling the first power converter and enabling the second power converter when the parameter is above the second power capacity.

2. The power supply unit of claim 1, wherein the second power capacity is two times greater than the first power capacity.

3. The power supply unit of claim 1, further comprising a single rectifier/power factor correction stage coupled between an input of the power supply unit for receiving an alternating current input waveform and inputs of both the first power converter and the second power converter.

4. The power supply unit of claim 1, further comprising:
a first rectifier/power factor correction stage coupled between an input of the power supply unit for receiving an alternating current input waveform and an input of the first power converter; and
a second rectifier/power factor correction stage coupled between the input of the power supply unit and an input of the second power converter.

5. The power supply unit of claim 4, wherein the controller is further configured to selectively enable and disable each of the first rectifier/power factor correction stage and the second rectifier/power factor correction stage based on one or more parameters associated with the power supply unit such that:
the first rectifier/power factor correction stage is enabled when the first power converter is enabled and disabled when the first power converter is disabled; and
the second rectifier/power factor correction stage is enabled when the second power converter is enabled and disabled when the second power converter is disabled.

6. The power supply unit of claim 5, further comprising:
a first bulk capacitor coupled between the first power converter and the first rectifier/power factor correction stage;
a second bulk capacitor coupled between the second power converter and the second rectifier/power factor correction stage; and
a diode coupled between the first bulk capacitor and the second bulk capacitor and configured to maintain an electrical charge on the second bulk capacitor when the second rectifier/power factor correction stage is disabled.

7. The power supply unit of claim 1, wherein the power parameter comprises a power demand of the power supply unit.

8. The power supply unit of claim 1, wherein the controller is further configured to initiate a current overprotection procedure for the first power converter and the second power converter when the power demand of the power supply unit in greater than a sum of the first power capacity and the second power capacity.

9. The power supply unit of claim 1, wherein the power parameter comprises an authorized power capacity of the power supply unit.

10. The power supply unit of claim 9, wherein the controller is further configured to:
enable the first power converter and disable the second power converter when the authorized power capacity of the power supply unit is a first authorized power capacity;
enable the second power converter and then disable the first power converter when the authorized power capacity of the power supply unit is a second authorized power capacity greater than the first authorized power capacity; and
enable the first power converter and enable the second power converter when the authorized power capacity of the power supply unit is a third authorized power capacity greater than the second authorized power capacity.

11. A method for use in a power supply unit comprising a first power converter configured to generate an output voltage to an output of the power supply unit, wherein the first power converter has a first power capacity and a second power converter configured to generate the output voltage to the output of the power supply unit, wherein the second power converter has a second power capacity substantially greater than the first power capacity, the method comprising:
selectively enabling and disabling each of the first power converter and the second power converter based on a power parameter associated with the power supply unit, wherein such selective enabling and disabling of the first power converter and the second power converter comprises:
enabling the first power converter and disabling the second power converter when the power parameter is below the first power capacity;
enabling the second power converter and then disabling the first power converter when the power parameter is above the first power capacity and below the second power capacity; and
enabling the first power converter and enabling the second power converter when the parameter is above the second power capacity.

12. The method of claim 11, wherein the second power capacity is two times greater than the first power capacity.

13. The method of claim 11, wherein the power supply unit further comprises a single rectifier/power factor correction stage coupled between an input of the power supply unit for receiving an alternating current input waveform and inputs of both the first power converter and the second power converter.

14. The method of claim 11, wherein the power supply unit further comprises:
a first rectifier/power factor correction stage coupled between an input of the power supply unit for receiving an alternating current input waveform and an input of the first power converter; and
a second rectifier/power factor correction stage coupled between the input of the power supply unit and an input of the second power converter.

15. The method of claim 14, further comprising selectively enabling and disabling each of the first rectifier/power factor correction stage and the second rectifier/power factor correction stage based on one or more parameters associated with the power supply unit such that:
the first rectifier/power factor correction stage is enabled when the first power converter is enabled and disabled when the first power converter is disabled; and
the second rectifier/power factor correction stage is enabled when the second power converter is enabled and disabled when the second power converter is disabled.

16. The method of claim 15, wherein:
the power supply comprises a first bulk capacitor coupled between the first power converter and the first rectifier/power factor correction stage and a second bulk capacitor coupled between the second power converter and the second rectifier/power factor correction stage; and
the method further comprising maintaining an electrical charge on the second bulk capacitor when the second rectifier/power factor correction stage is disabled.

17. The method of claim 11, wherein the power parameter comprises a power demand of the power supply unit.

18. The method of claim 11, further comprising initiating a current overprotection procedure for the first power converter and the second power converter when the power demand of the power supply unit is greater than a sum of the first power capacity and the second power capacity.

19. The method of claim 11, wherein the power parameter comprises an authorized power capacity of the power supply unit.

20. The method of claim 19, further comprising:
enabling the first power converter and disabling the second power converter when the authorized power capacity of the power supply unit is a first authorized power capacity;
enabling the second power converter and then disabling the first power converter when the authorized power capacity of the power supply unit is a second authorized power capacity greater than the first authorized power capacity; and enabling the first power converter and enabling the second power converter when the authorized power capacity of the power supply unit is a third authorized power capacity greater than the second authorized power capacity.

* * * * *